(12) United States Patent
Takeda

(10) Patent No.: US 7,673,994 B2
(45) Date of Patent: Mar. 9, 2010

(54) IMAGE DISPLAY APPARATUS AND CONTROL METHOD FOR THE SAME

(75) Inventor: Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 897 days.

(21) Appl. No.: 11/459,511

(22) Filed: Jul. 24, 2006

(65) Prior Publication Data

US 2007/0046903 A1    Mar. 1, 2007

(30) Foreign Application Priority Data

Aug. 24, 2005    (JP) .............................. 2005-242242

(51) Int. Cl.
*G03B 21/28* (2006.01)
*G02B 26/08* (2006.01)

(52) U.S. Cl. .................. 353/77; 359/196.1; 359/223.1; 359/225.1

(58) Field of Classification Search ... 359/196.1–226.3, 359/298; 353/31, 74, 77; 345/102; 352/243
See application file for complete search history.

(56) References Cited

U.S. PATENT DOCUMENTS

| | | | | |
|---|---|---|---|---|
| 5,966,009 | A * | 10/1999 | Asada | 324/97 |
| 6,027,257 | A * | 2/2000 | Richards et al. | 396/428 |
| 6,400,340 | B1 * | 6/2002 | Nishida | 345/1.1 |
| 6,857,746 | B2 * | 2/2005 | Dyner | 353/28 |
| 6,860,606 | B2 * | 3/2005 | Childers et al. | 353/31 |
| 6,945,652 | B2 * | 9/2005 | Sakata et al. | 353/30 |
| 7,101,045 | B2 * | 9/2006 | Romanoff et al. | 352/243 |
| 7,110,153 | B2 * | 9/2006 | Sakai | 359/212.2 |
| 7,147,331 | B2 * | 12/2006 | Yamazaki et al. | 353/31 |
| 7,153,015 | B2 * | 12/2006 | Brukilacchio | 362/555 |
| 7,163,294 | B2 * | 1/2007 | Nambudiri et al. | 353/31 |
| 7,202,850 | B2 * | 4/2007 | Kitagawa | 345/102 |
| 7,404,645 | B2 * | 7/2008 | Margulis | 353/31 |
| 7,414,621 | B2 * | 8/2008 | Yavid et al. | 345/204 |
| 7,436,415 | B2 * | 10/2008 | Takata et al. | 345/690 |
| 7,494,227 | B2 * | 2/2009 | Yamazaki et al. | 353/85 |
| 2003/0021497 | A1 * | 1/2003 | Kandori et al. | 382/323 |
| 2004/0001182 | A1 * | 1/2004 | Dyner | 353/28 |
| 2004/0004585 | A1 * | 1/2004 | Brown et al. | 345/32 |
| 2004/0223202 | A1 * | 11/2004 | Lippert et al. | 359/201 |

(Continued)

FOREIGN PATENT DOCUMENTS

JP    A-2001-189520    7/2001

OTHER PUBLICATIONS

John Hewes, Light Emitting Diodes (LEDs), 2004, www.kpsec.freeuk.com/components/led.htm, p. 1 of 5.*

*Primary Examiner*—Georgia Y Epps
*Assistant Examiner*—Danell L Owens
(74) *Attorney, Agent, or Firm*—Oliff & Berridge, PLC

(57) ABSTRACT

An image display apparatus that displays an image through scanning by a plurality of beam lights, includes: a light source section that supplies the beam lights; and a scanning section that subjects to scanning the beam lights coming from the light source section. In the image display apparatus, the light source section is driven for a tone representation using the beam lights each having a light amount that is assigned a weight depending on how many bits are allocated in a range from minimum to maximum, and allocates at least two of the beam lights to at least one higher-order bit in the range.

9 Claims, 16 Drawing Sheets

U.S. PATENT DOCUMENTS

| | | | |
|---|---|---|---|
| 2005/0007563 A1* | 1/2005 | Yamazaki et al. | 353/98 |
| 2005/0036119 A1* | 2/2005 | Ruda et al. | 353/99 |
| 2005/0047134 A1* | 3/2005 | Mueller et al. | 362/231 |
| 2005/0184947 A1* | 8/2005 | Maeyama et al. | 345/94 |
| 2006/0082852 A1* | 4/2006 | Wine et al. | 359/199 |
| 2006/0114271 A1* | 6/2006 | Takeda | 345/690 |
| 2008/0112028 A1* | 5/2008 | Peterson | 359/204 |

* cited by examiner

|  | COMPARISON EXAMPLE | EXAMPLE 1 |
| --- | --- | --- |
| LD1 | 0.25 mW | 1 mW |
| 2 | 0.5 mW | 2 mW |
| 3 | 1 mW | 4 mW |
| 4 | 2 mW | 8 mW |
| 5 | 4 mW | 16 mW |
| 6 | 8 mW | 32 mW |
| 7 | 16 mW | 64 mW |
| 8 | 32 mW | 128 mW |
| 9 | 64 mW | 128 mW |
| 10 | 128 mW | 128 mW |
| MAXIMUM OUTPUT | 255.75 mW | 511 mW |
| NUMBER OF TONES | 10 BITS | 9 BITS |

FIG. 5

|  | EXAMPLE 2 | EXAMPLE 3 |
|---:|:---:|:---:|
| LD1 | 1 mW, 128 mW | 1 mW, 128 mW |
| 2 | 2 mW, 4 mW | 8 mW, 16 mW, 32 mW |
| 3 | 8 mW, 16 mW | 2 mW, 4 mW, 64 mW |
| 4 | 32 mW, 64 mW | 128 mW |
| 5 | 128 mW | 128 mW |
| 6 | 128 mW | 128 mW |
| 7 | 128 mW | 128 mW |
| 8 | 128 mW | 128 mW |
| 9 | 128 mW | 128 mW |
| 10 | 128 mW | 128 mW |
| MAXIMUM OUTPUT | 1023 mW | 1151 mW |
| NUMBER OF TONES | 10 BITS | 10 BITS[+] |

FIG. 12

|  | PULSE WIDTH | OUTPUT | OUTPUTS AVAILABLE FOR SELECTION |
|---|---|---|---|
| LD1 | 0.5, 1 | 2 mW | 1 mW, 2 mW |
| 2 | 0.5, 1 | 6 mW | 3 mW, 6 mW |
| 3 | 0.5, 1 | 18 mW | 9 mW, 18 mW |
| 4 | 0.5, 1 | 54 mW | 27 mW, 56 mW |
| 5 | 0.5, 1 | 162 mW | 81 mW, 162 mW |
| 6 | 1 | 162 mW | 162 mW |
| 7 | 1 | 162 mW | 162 mW |
| 8 | 1 | 162 mW | 162 mW |
| 9 | 1 | 162 mW | 162 mW |
| 10 | 1 | 162 mW | 162 mW |
| MAXIMUM OUTPUT | | 1052 mW | |
| NUMBER OF TONES | | 10 BITS | |

FIG. 17

IMAGE DISPLAY APPARATUS AND CONTROL METHOD FOR THE SAME

BACKGROUND

1. Technical Field

The present invention relates to an image display apparatus and a control method therefor and, more specifically, to the technology for an image display apparatus that displays images through scanning by beam lights modulated in accordance with an image signal.

2. Related Art

The image display apparatus of a recent type for image display is a laser projector, which displays images through scanning by laser lights. The laser lights have characteristics of being highly monochrome and directive so that the images to be displayed by the laser projector can be advantageously high in color reproducibility. The laser projector displays images through modulation of laser lights using rectangular pulse-like modulation currents, for example. As an example, refer to Patent Document 1 (JP-A-2001-189520).

Patent Document 1 describes the technology of modulating laser lights through pulse width modulation. Assuming that a fully high-definition image of 1920 by 1080 pixels is displayed with 30 frames per second, the pixel clock representing the timing for pixel scanning using laser lights will be 62.2 megahertz (MHz). This thus requires a modulation frequency of 16 gigahertz (GHz) for a tone representation of 8 bits. For such high-speed modulation, the configuration is complicated to drive a light source, resulting in high manufacturing cost. Especially a laser light source of high output has a great difficulty in precisely driving with the modulation frequency as high as 16 GHz, thereby possibly reducing the modulation precision and apparatus reliability. When it is difficult to increase the modulation frequency as such, a plurality of laser lights may be used for a tone representation to reduce the modulation frequency of the respective laser lights. If this is the case, however, using 10 laser lights for a tone representation merely achieves 10-fold increase for the minimum pulse width, and this is considered not enough for reduction of the modulation frequency.

Patent Document 1 also describes the technology of adjusting the laser lights by light amount to be proportionate to a power of 2, and selecting the laser lights to suit the number of tones, i.e., the number of quantized bits, for display. The technology uses a light source drive pulse signal synchronous to a pixel clock so that the modulation frequency can be reduced. For an 8-bit tone representation, for example, 8 laser lights are allocated bits of 0 to 7, respectively. The laser light allocated 7-bit being the maximum number of bits will have the light amount equivalent to 128 tones. In this case, the maximum number of tones displayable using 8 Laser lights will be equivalent to 255 tones in terms of light amount. It means that even with 8 laser lights, the resulting light amount will be less than the value of doubling the light amount of a laser light allocated the maximum number of bits. If with 10 laser lights, the resulting light amount will be much less than the doubling the light amount of the laser light allocated the maximum number of bits. Such a previous technology has a difficulty in being able to offer bright images with a simple and reliable configuration.

SUMMARY

An advantage of some aspects of the invention is to provide an image display apparatus that is capable of displaying bright images with a simple and reliable configuration, and a control method for such an image display apparatus.

The invention is directed to an image display apparatus that displays images through scanning by a plurality of beam lights, including: a light source section that supplies the beam lights; and a scanning section that subjects to scanning the beam lights coming from the light source section. In such an image display apparatus, the light source section is driven for a tone representation using the beam lights each having a light amount that is assigned a weight depending on how many bit is allocated in a range from minimum to maximum, and allocates at least two of the beam lights to at least one higher-order bit in the range.

In the image display apparatus, any lower-order bit in the range from minimum to maximum is allocated a single beam light of the light amount suiting the number of bits. At least one higher-order bit is allocated at least two beam lights. By allocating a plurality of beam lights as such to at least one higher-order bit, the light amount for the maximum number of tones can be increased compared with a case of allocating every bit a single beam light. This favorably increases the number of tones available for display so that the resulting display images can be bright. The image display apparatus takes the configuration that the number of tones, i.e., the number of quantized bits, for display is used as a basis for beam light selection, and this enables to drive the light source section in accordance with a light source drive pulse signal synchronous to a pixel clock. Such a configuration also enables to reduce the modulation frequency compared with a case for a tone representation in a previous manner, i.e., through pulse width modulation. As such, there is no more need for the complicated and expensive configuration for super-high-speed modulation, and the configuration can be high in reliability. Such a resulting simple and reliable configuration can successfully lead to an image display apparatus capable of displaying bright images.

According to a preferable aspect of the invention, the light source section supplies a plurality of beam lights each having the light amount that is adjusted to be substantially proportionate to a power of 2. This enables a tone representation through beam light selection in accordance with the number of tones, i.e., the number of quantized bits, for display.

According to another preferable aspect of the invention, the light source section is driven to allocate two or more of the number of bits to a part of the beam lights. This increases the number of possible combinations available for beam light selection, and increases the maximum number of tones, thereby enabling to increase the number of tones available for display. As such, the resulting images can be much brighter with higher quality.

According to still another preferable aspect of the invention, compared with a case of allocating the number of bits sequentially from minimum to maximum, the light source section allocates the number of bits by leveling an output difference among the beam lights. This favorably reduces the output variation observed among the beam lights. This enables the use of a plurality of laser devices all having the same maximum output, and enables to cut wastes by leveling the output difference among the beam lights, for example.

According to still another preferable aspect of the invention, the light source section is driven to change the illumination length of time for a part of the beam lights in accordance with two or more of a pulse width. With this being the case, the number of possible combinations can be increased for beam light selection, and the maximum number of tones can be also increased, thereby enabling to increase the number of tones available for display. As such, the resulting images can be much brighter with higher quality.

According to still another preferable aspect of the invention, a light source drive section is further included to drive the light source section. The light source drive section is provided with a first drive section that supplies any of the beam lights allocated a lower-order bit in the range from minimum to maximum, and a second drive section that supplies any of the beam lights allocated a higher-order bit in the range from minimum to maximum. The beam light allocated a lower-order bit requires a small output, and the beam light allocated a higher-order bit requires a large output. The lower-order bits may require multilevel control, but not the higher-order bits. In consideration thereof, the first drive section may take charge of beam lights allocated any lower-order bit, and the second drive section may take charge of beam lights allocated any higher-order bit so that the resulting configuration can suit any incoming beam lights. This favorably enables to cut the power consumption with no waste of components, thereby saving power and cost.

According to still preferable aspect of the invention, the light source section includes a plurality of beam light emission sections for emission of the beam lights, and any of the beam light emission sections is disposed in a part of the light source section when the beam light therefrom is high in light amount. For example, if a cooling section is disposed in an area including the beam light emission section that emits the beam light high in light amount, the light source section can dissipate heat with efficiency. Alternatively, the beam light emission section emitting the beam light high in light amount may be disposed in an area of easy heat dissipation. With such a configuration as partially including the beam light emission section emitting the beam light high in light amount, the resulting light source section can be increased in efficiency for heat dissipation.

According to still another preferable aspect of the invention, the light source section includes a plurality of beam light emission sections for emission of the beam lights, and any of the beam light emission sections is disposed, when the beam light therefrom is small in light amount, between any of the beam light emission sections that emit the beam lights large in light amount. This enables to prevent the heat generated by the beam light emission sections from being localized, and to reduce the frequency of problems.

The invention is also directed to a control method for an image display apparatus that displays an image through scanning by a beam light. The control method includes: supplying plurally the beam light; and scanning a to-be-exposed area by the beam lights in a first direction, and in a second direction substantially orthogonal to the first direction. In the supplying, a tone representation is made using the beam lights each having a light amount that is assigned a weight depending on how many bit is allocated in a range from minimum to maximum, and at least two of the beam lights are allocated to at least one higher-order bit in the range. With the control method, at least one higher-order bit is allocated a plurality of beam lights so that the light amount for the maximum number of tones can be increased compared with a case of allocating every bit a single beam light. This favorably increases the number of tones available for display so that the resulting display images can be bright. With the configuration that the number of tones, i.e., the number of quantized bits, for display is used as a basis for beam light selection, and this enables beam light supply in accordance with a light source drive pulse signal synchronous to a pixel clock. Such a configuration also enables to reduce the modulation frequency compared with a case for a tone representation in a previous manner, i.e., through pulse width modulation. As such, there is no more need for the complicated and expensive configuration for super-high-speed modulation, and the configuration can be high in reliability. Such a resulting simple and reliable configuration can lead to an image display apparatus capable of displaying bright images.

BRIEF DESCRIPTION OF THE DRAWINGS

The invention will be described with reference to the accompanying drawings, wherein like numbers reference like elements.

FIG. 5 is a diagram for illustrating light amount allocation for laser lights.

FIG. 12 is a diagram for illustrating an image display device in a second embodiment of the invention.

FIG. 17 is a diagram for illustrating an image display device in a third embodiment of the invention.

DESCRIPTION OF EXEMPLARY EMBODIMENTS

By referring to the accompanying drawings, embodiments of the invention are described in detail.

First Embodiment

Figure 1:
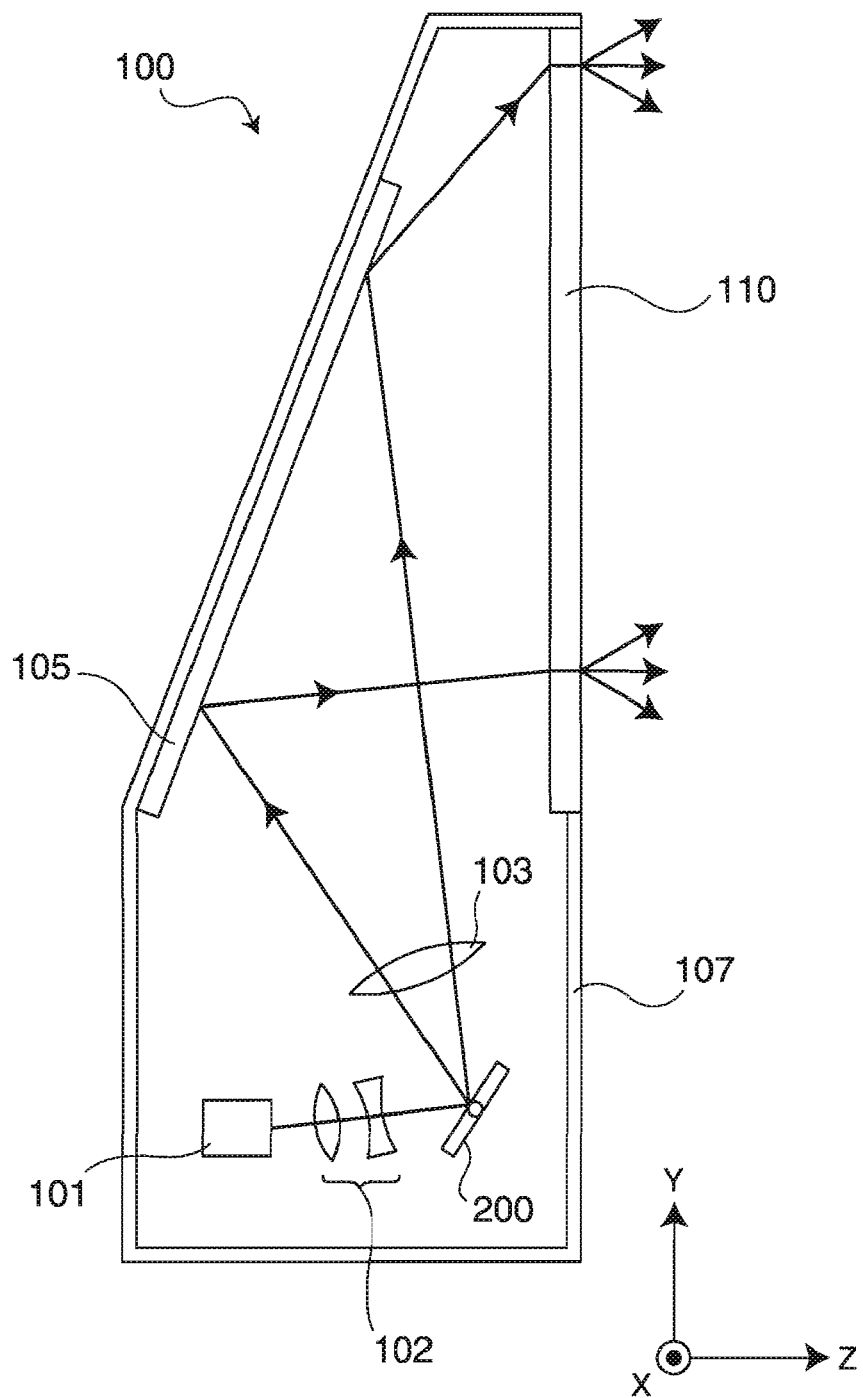
FIG. 1 is a schematic diagram showing the configuration of an image display apparatus in a first embodiment of the invention.

FIG. 1 shows the schematic configuration of an image display apparatus 100 in a first embodiment of the invention. The image display apparatus 100 is a so-called rear projector that makes images available for viewing by supplying a laser light to one surface of a screen 110, and by a viewer looking at the laser light exiting from the other surface of the screen 110. The image display apparatus 100 displays images by making the laser light scan in X and Y directions. The laser light is a plurality of beam lights, and the x direction is horizontal, and the Y direction is vertical.

Figure 2:
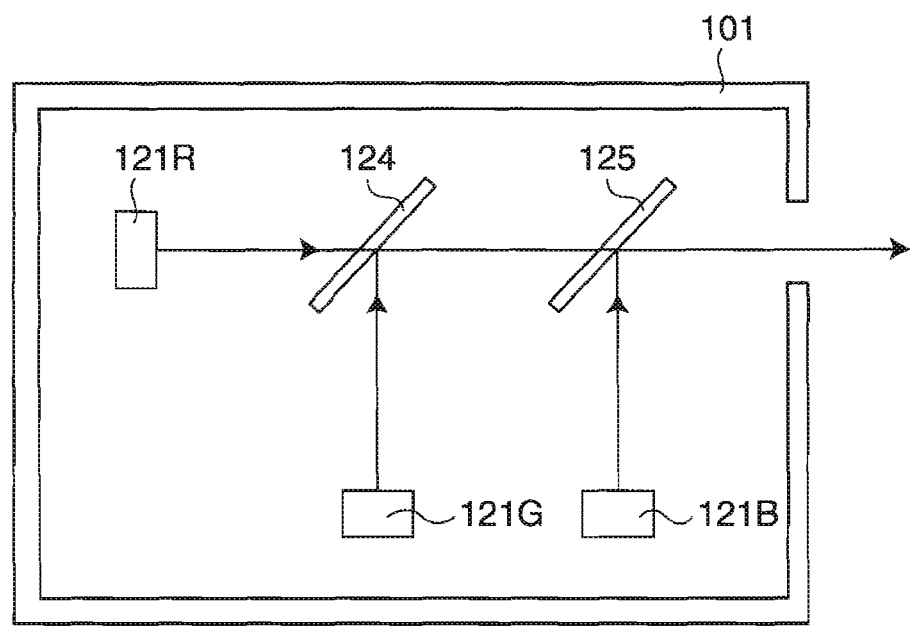
FIG. 2 is a schematic diagram showing the configuration of a laser apparatus.

FIG. 2 shows the schematic configuration of a laser apparatus 101. The laser apparatus 101 is configured to include three R, G, and B light source sections 121R, 121G, and 121B. The R light source section 121R is specifically for a red laser light being beam lights (hereinafter, "R light"), the G light source section 121G is specifically for a green laser light being beam lights ("G light") and the B light source section 121B is specifically for a blue laser light being beam lights ("B light").

Such R, G, and B light source sections 121R, 121G, and 121B each supply 10 laser lights that are modulated in accordance with an image signal. The light source sections 121R, 121G, and 121B are each provided with 10 laser diode devices for laser light supply, for example. The laser apparatus 101 is provided with two dichroic mirrors 124 and 125. The dichroic mirror 124 passes through the R light, and reflects the G light. The dichroic mirror 125 passes through the R and G lights, and reflects the B light. The R light coming from the R light source section 121R first passes through the dichroic mirrors 124 and 125, and then is emitted from the laser apparatus 101.

The optical path for the G light coming from the G light source section 121G is bent into substantially 90 degrees by being reflected by the dichroic mirror 124. The G light reflected by the dichroic mirror 124 passes through the dichroic mirror 125, and then is emitted from the laser apparatus 111. The optical path for the B light coming from the B light source section 121B is bent into substantially 90 degrees by being reflected by the dichroic mirror 125. The B light reflected by the dichroic mirror 125 is emitted from the laser apparatus 101. As such, the laser apparatus 101 supplies the R, G, and B lights that are modulated in accordance with an image signal.

Referring back to FIG. 1, the laser light coming from the laser apparatus 101 is directed into a scanning section 200 after going through an illumination system 102. The light from the scanning section 200 is directed to a reflection section 105 after going through a projection system 103. The illumination system 102 and the projection system 103 project the laser light from the laser apparatus 101 onto the screen 110. The reflection section 105 reflects the laser light from the scanning section 200 in the direction of the screen 110. A cabinet 107 seals tight its inner space.

The screen 110 is provided to a predetermined surface of the cabinet 107. The screen 110 is of a transmissive type that passes through the laser light modulated in accordance with an image signal. The light from the reflection section 105 first enters to the inner-side surface of the cabinet 107, i.e., the screen 110, and is then emitted from the surface on the viewer side. The viewer views images by looking at the light exiting from the screen 110. As an alternative configuration, the image display apparatus 100 may make 10 parallel laser lights scan every color. With this being the configuration, the 10 laser lights may be partially or entirely overlaid on one another for scanning.

Figure 3:
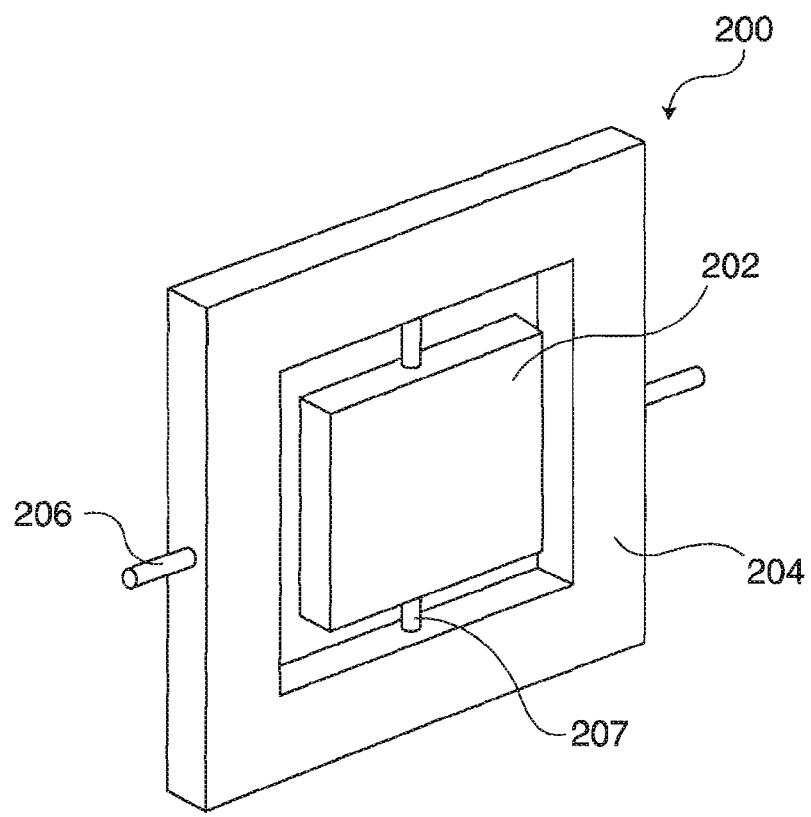
FIG. 3 is a schematic diagram showing the configuration of a scanning section.

FIG. 3 shows the schematic configuration of the scanning section 200. The scanning section 200 is of a so-called double-gimbaled configuration, including a reflective mirror 202, and an external frame section 204 provided around the reflective mirror 402. The external frame section 204 is coupled to a fixation section (not shown) using a torsion spring 206 being a rotation axis. The external frame section 204 rotates about the torsion spring 206 utilizing the torsion of the torsion spring 206, and the repulsion force thereof wanting to be back to the original state. The reflective mirror 202 is coupled to the external frame section 204 by another torsion spring 207, which is a rotation axis substantially orthogonal to the torsion spring 206. The reflective mirror 202 reflects the laser light coming from the laser apparatus 101. The reflective mirror 202 is configured by forming a highly-reflective member, e.g., a metal thin film of aluminum, silver, or others.

In response to the external frame section 204 rotating about the torsion spring 206, the reflective mirror 202 is displaced in position so as to make the laser light scan in the Y direction (refer to FIG. 1) in the screen 110. The reflective mirror 202 rotates about the torsion spring 207 utilizing the torsion of the torsion spring 207, and the repulsion force thereof wanting to be back to the original state. By rotating about the torsion spring 207, the reflective mirror 202 is displaced in position so as to make the laser light reflected thereby scan in the X direction. As such, the scanning section 200 makes the laser light coming from the laser apparatus 101 scan in the X and Y directions repeatedly.

Figure 4:
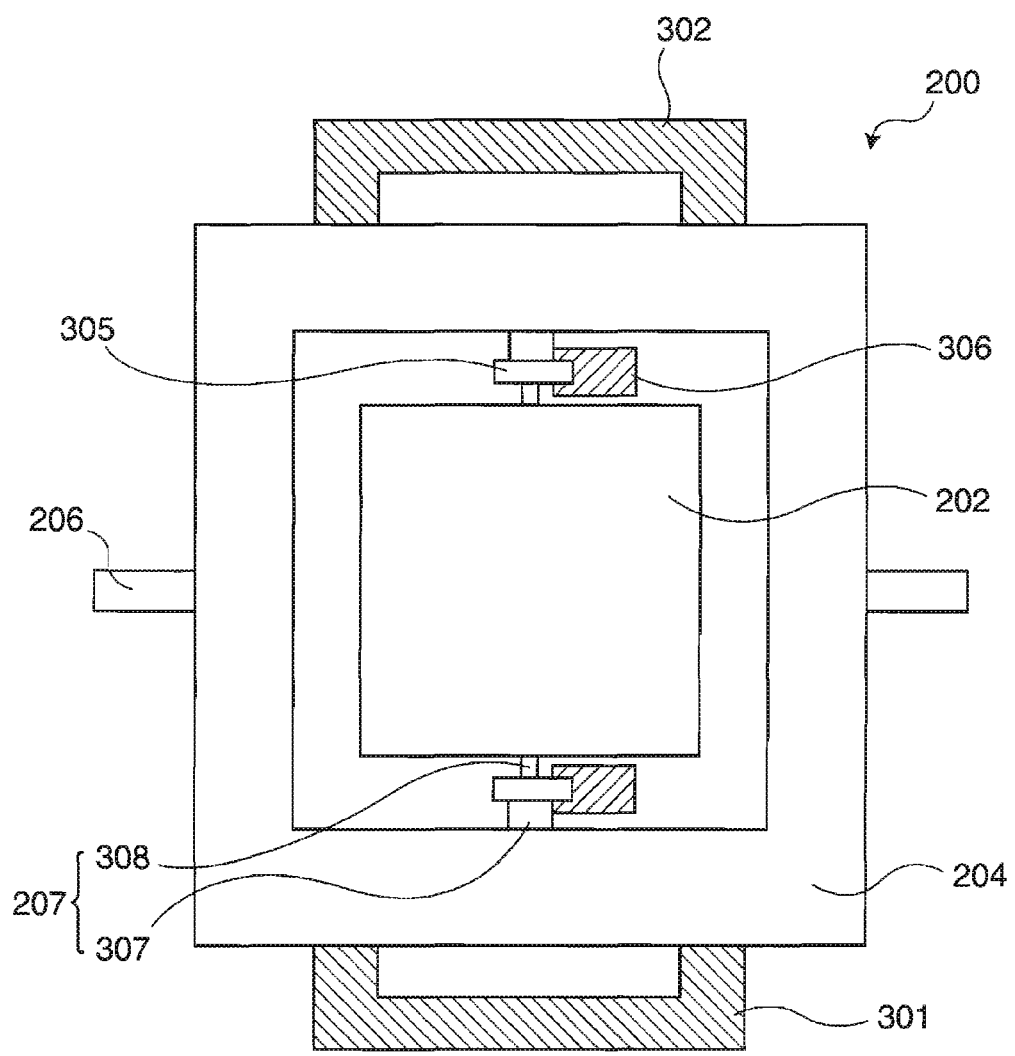
FIG. 4 is a diagram for illustrating the configuration for driving the scanning section.

FIG. 4 is a diagram for illustrating the configuration for driving the scanning section 200. Assuming that the side of the reflective mirror 202 reflecting thereon the laser light is the front side, first electrodes 301 and 302 are disposed in the back space of the external frame section 204 to be substantially symmetric with respect to the torsion spring 206. When a voltage is applied to the first electrodes 301 and 302, a predetermined force suiting the potential difference, e.g., electrostatic force, is generated between the first electrodes 301 and 302 and the external frame section 204. Through alternate voltage application to the first electrodes 301 and 302, the external frame section 204 rotates about the torsion spring 206.

More in detail, the torsion spring 207 is configured by first and second torsion springs 307 and 308. Between the first and second torsion springs 307 and 308, a mirror-side electrode 305 is disposed. To the space backside of the mirror-side electrode 305, a second electrode 306 is disposed. When the second electrode 306 is applied with a voltage, a predetermined force suiting the potential difference, e.g., electrostatic force, is generated between the second electrode 306 and the mirror-side electrode 305. When every second electrode 306 is applied with a voltage of the same phase, the reflective mirror 202 rotates about the torsion spring 207. By rotating the reflective mirror 202 as such, the scanning section 200 makes the laser light scan in the two-dimensional direction. The scanning section 200 can be formed by the MEMS (Micro Electro Mechanical Systems) technology, for example.

The scanning section 200 displaces the reflective mirror 202 in position to enable the laser light to reciprocate for a plurality of times in the X direction while scanning once in the Y direction in an image frame period, for example. Herein, the X direction is the main scanning direction, and the Y direction is the sub scanning direction. Assuming that the X direction is a first direction, and the Y direction is a second direction that is substantially orthogonal to the first direction, the scanning section 200 is so driven that the frequency for the laser light to scan in the first direction becomes higher than the frequency for the laser light to scan in the second direction. To achieve such scanning by the laser light in the X direction at high speed, the scanning section 200 is preferably configured to achieve resonance operation of the reflective mirror 202 about the torsion spring 207. With the resonance operation of the reflective mirror 202, the displacement amount of the reflective mirror 202 can be increased. With the displacement amount of the reflective mirror 202 increased as such, the scanning section 200 becomes able to take charge of laser light scanning with efficiency with less energy. The resonance operation of the reflective mirror 202 is not restrictive, and any other operation will do to drive the reflective mirror 202.

The scanning section 200 is not restrictive to be driven by the electrostatic force suiting the potential difference. Alternatively, the scanning section 200 may be driven utilizing the expansion and contraction force of a piezoelectric device or the electromagnetic force. The scanning section 200 may be provided with two reflective mirrors, one is for laser light scanning in the X direction, and the other is for laser light scanning in the Y direction.

FIG. 5 illustrates an example 1 and a comparison example. In the example 1, the light amount of the laser light is allocated by the image display device 100 of the invention, and in the comparison example, the light amount of the laser light is allocated by the previous technology. With both of the example 1 and the comparison example, a tone representation is made using laser lights each having the light amount that is weighed in accordance with the a located number of bits in the range from minimum to maximum. With the comparison example, a 10-bit tone representation is made by selecting 10 laser lights in accordance with the number of tones, i.e., the number of quantized bits, for display. Here, the 15 laser lights are those respectively allocated the number of bits in the range from 0 to 9.

In the comparison example, laser diode devices (hereinafter, referred to as "LDs" whenever appropriate) 1 to 10 are each allocated the light amount in a range from 0.25 mW to 128 mW. Such allocation is so made that the light amount is proportionate to a power of 2, and is increased sequentially. The laser light allocated the maximum number of bits, i.e., 9 bits, will have the light amount equivalent to 128 tones. The maximum number of tones possibly displayed by the 10 laser lights will be of the light amount equivalent to 255.75 tones. This tells that, in the comparison result, even with 10 laser lights, the resulting light amount will be less than the value of doubling the light amount of the laser light allocated the maximum number of bits, i.e., 256 tones.

The image display apparatus 100 of the invention goes through light amount allocation to the LDs 1 to 10 in a different manner from the comparison example. The LDs 1 to 10 are each allocated the light amount proportionate to a power of 2, i.e., in a range from 1 mW to 128 mW. The light source sections provided for each corresponding color each make a supply of 10 laser lights, which are adjusted by light amount to be proportionate to a power of 2. The LDs 1 to 8 are each allocated the light amount, i.e., in a range from 1 mW to 128 mW, in such a manner that the amount is sequentially increased. The LDs 9 and 10 are both allocated 128 mW as to the LD 8.

The LDs 1 to 8 are each allocated the number of bits in the range from 0 to 7, respectively. The LDs 9 and 10 are both allocated 8 bits. The LDs 9 and 10 are in charge of an output of 256 mW in total by starting or stopping illumination of the laser light all at once. In the invention, in the range from 0 being minimum to 8 being maximum, the higher-order bits of 1 to 8 are each allocated two laser lights. With the example 1, 10 laser lights each allocated the number of bits in the range from 0 to 8 are selected in accordance with the number of tones, i.e., the number of quantized bits, for display so that a 9-bit tone representation is made.

In the example 1, the number of tones is smaller by 1-bit compared with the comparison example. In terms of maximum output, the comparison example achieves 255.75 mW, and the example 1 achieves 511 mW, which is an almost doubled value of the maximum output in the comparison example. By allocating a plurality of laser lights to at least one higher-order bit, the light amount with the maximum number of tones can be increased compared with the comparison example in which every bit is allocated a single laser light.

As such, the image display device 100 of the invention can increase the number of tones available for display so that the resulting display images can be bright. Moreover, the image display device 100 takes the configuration that the number of tones, i.e., the number of quantized bits, for display is used as a basis for laser light selection, and this enables to drive the light source section in accordance with a light source drive pulse signal synchronous to a pixel clock. Such a configuration also enables to reduce the modulation frequency compared with a case for a tone representation in a previous manner, i.e., through pulse width modulation. As such, there is no more need for the complicated and expensive configuration for super-high-speed modulation, and the configuration can be high in reliability. Such a resulting simple and reliable configuration can lead to an image display apparatus capable of displaying bright images.

Figure 6:
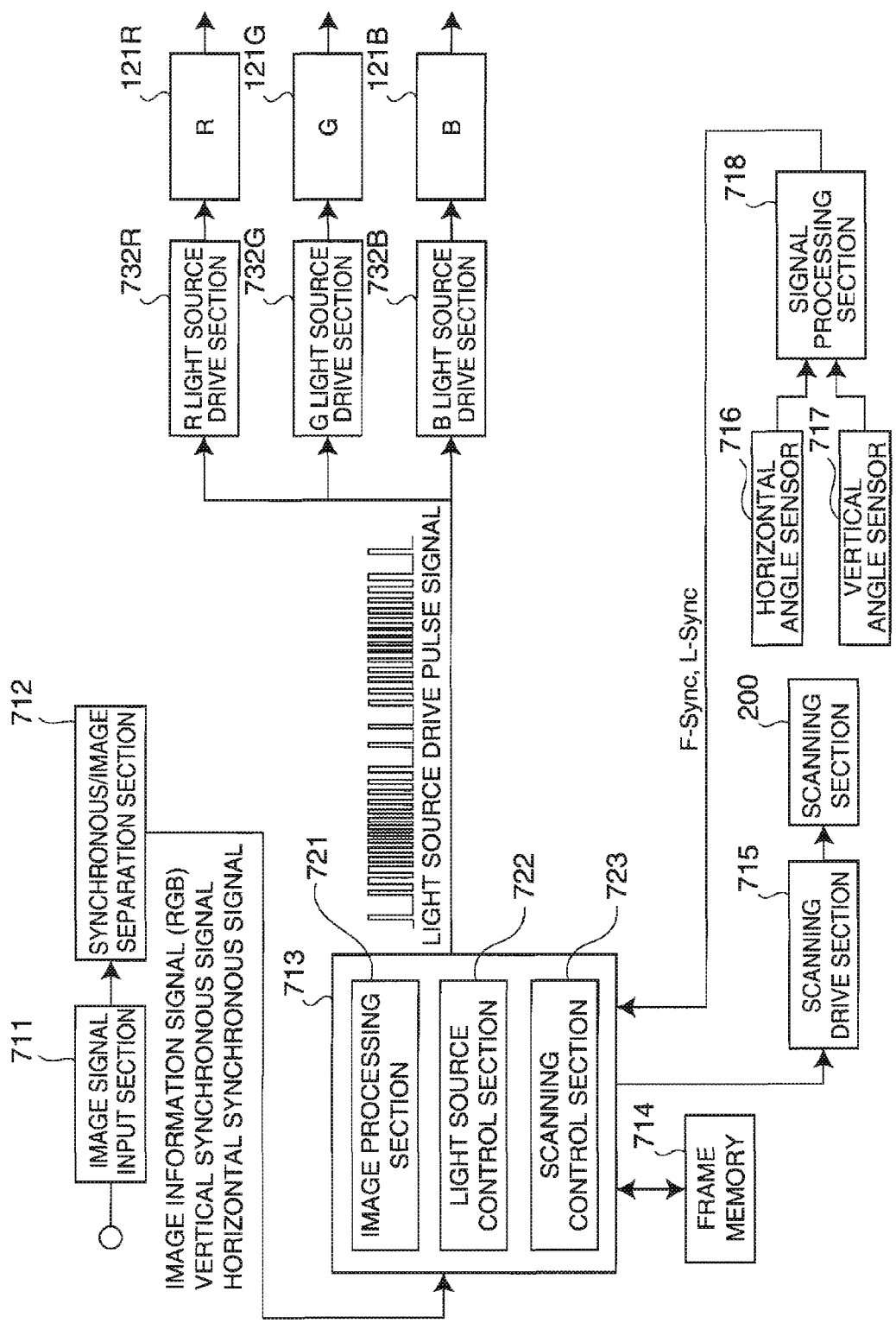
FIG. 6 is a diagram showing the block configuration for controlling the image display apparatus.

FIG. 6 shows the block configuration for controlling the image display device 100. An image signal input section 711 applies property correction, amplification, and others to an image signal provided by an input terminal. For example, the image signal input section 711 converts an analog image signal to a digital signal of the strength for light source modulation, and outputs the resulting signal. Alternatively, the image signal input section 711 may take a configuration of outputting a digital image signal as a digital signal of the strength for light source modulation. A synchronous/image separation section 712 separates the signal from the image signal input section 711 into an image information signal, a vertical synchronous signal, and a horizontal synchronous signal for each of the R, G, and B lights. The resulting signals are forwarded to a control section 713. In the control section 713, an image processing section 721 divides image information on a frame basis, and forwards the resulting frame-based information to a frame memory 714. The frame memory 714 stores the image signal from the image processing section 721 on a frame basis.

In the control section 713, a scanning control section 723 generates a drive signal for driving the scanning section 200 based on the vertical and horizontal synchronous signals. In response to a drive signal provided by the control section 713, a scanning drive section 715 drives the scanning section 200. In the scanning process, with such a configuration, the laser light is made to scan in a to-be-exposed area in both the X and Y directions. A horizontal angle sensor 716 detects the tilt angle of the reflective mirror 202 (refer to FIG. 3), which makes the laser light scan in the x direction in the screen 110. A vertical angle sensor 717 detects the tilt angle of the reflective mirror 202 that makes the laser light scan in the Y direction in the screen 110. A signal processing section 718 generates a frame start signal F_Sync based on the displacement of the vertical angle sensor 717, and a line start signal L_Sync based on the displacement of the horizontal angle sensor 716. The resulting signals are forwarded to the control section 713.

The control section 713 generates a pixel timing clock based on the linear velocity calculated from the frame start signal F_Sync and the line start signal L_Sync, and the vertical synchronous signal and the horizontal synchronous signal. The pixel timing clock is a signal to see the timing or the laser light passing over the pixels, used to direct the laser light modulated in accordance with an image signal to any specific position with accuracy.

An R light source drive section 732R drives the R light source section 121R based on a light source drive pulse signal provided by the light source control section 722. Also based on the light source drive pulse signal, the R light source drive section 732R exercises control over 10 pieces of LDs 1 to 10 of the R light source section 121R. Similarly to the R light source drive section 732R, a G light source drive section 732G drives the G light source section 121G. Similarly to the R light source drive section 732R, a B light source drive section 732B drives the B light source section 121B. In the beam light supply process, with such a configuration, a plurality of laser lights are supplied.

Figure 7:
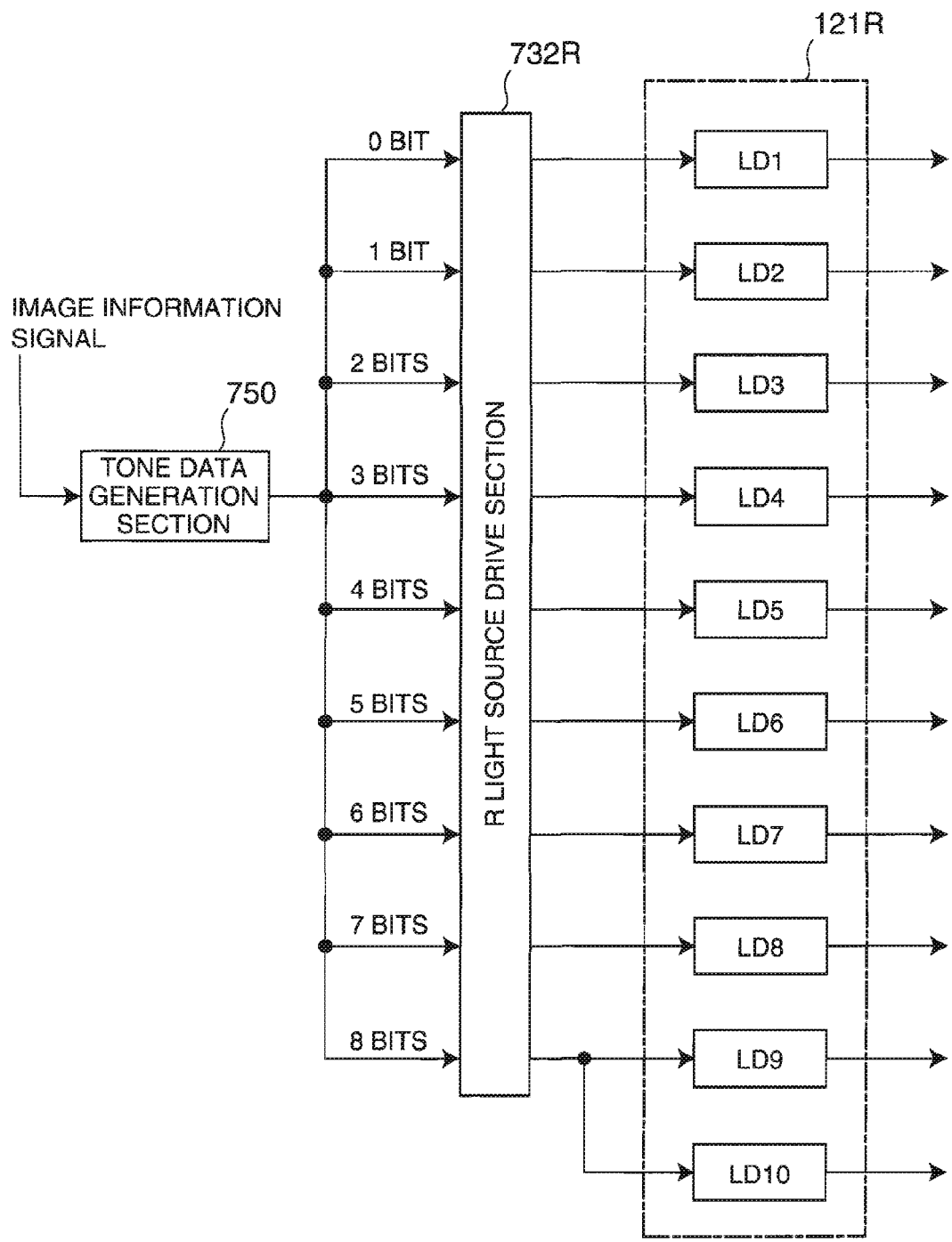
FIG. 7 is a diagram for illustrating the configuration for driving laser diode devices.

FIG. 7 illustrates in detail the configuration for driving the LDs 1 to 10 of the R light source section 121R. In the below, the R light source section 121R is mainly described among the light source sections. A tone data generation section 750 generates 9 control signals based on an image information signal read from the frame memory 714 (refer to FIG. 6). These 9 control signals each take the number of bits in the range from 0 being minimum to 8 being maximum. The 0- to 7-bit control signals are forwarded by the R light source drive section 732R to the LDs 1 to 8, respectively. The R light source drive section 732R forwards the 8-bit control signal to the LDs 9 and 10, respectively.

Figure 8:
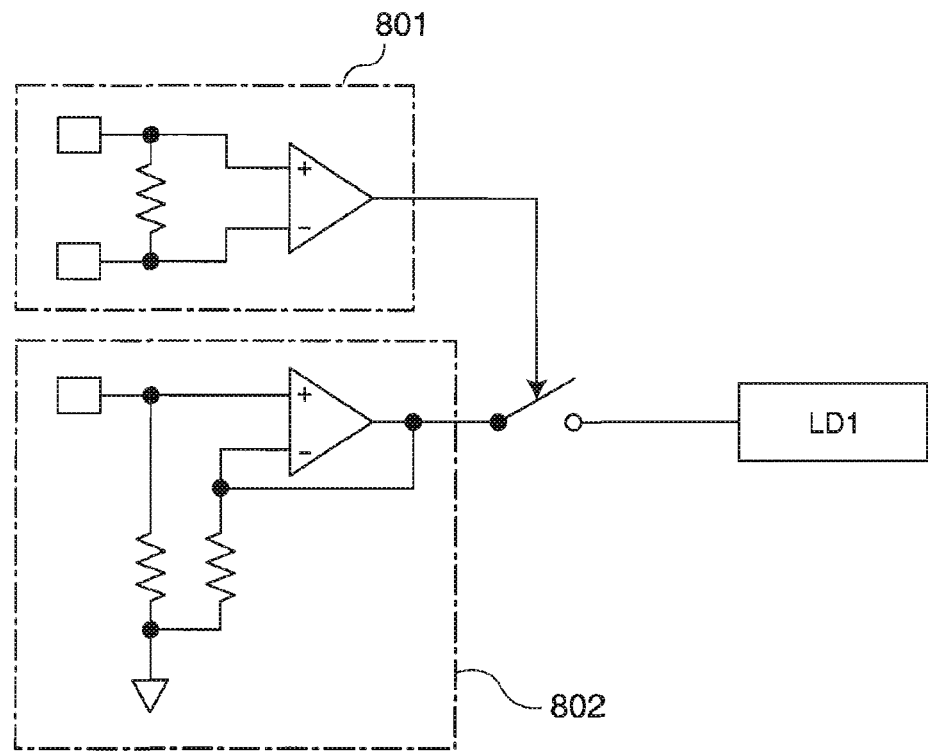
FIG. 8 is a diagram showing the configuration for driving a single piece of laser diode device.

FIG. 8 shows the configuration for driving the LD 1 of the R light source drive section 732R. Based on the control signals from the tone data generation section 750, i.e., 0-bit control signal allocated to the LD 1, a switch section 801 exercises control over starting and stopping the laser light supply. A current control section 802 adjusts the current value to be the output of 1 mW allocated to the LD 1. With such a configuration, the laser lights coming from the LD 1 can be controlled when to be supplied and when not.

The LDs 2 to 8 of the R light source section 121R are configured similarly to the LD 1, and are controlled when to supply the laser lights and when not. The LDs 9 and 10 are so configured that their switch sections 801 both operate in response to the 8-bit control signal, whereby the LDs 9 and 10 can start or stop laser light supply at the same time.

Figure 9:
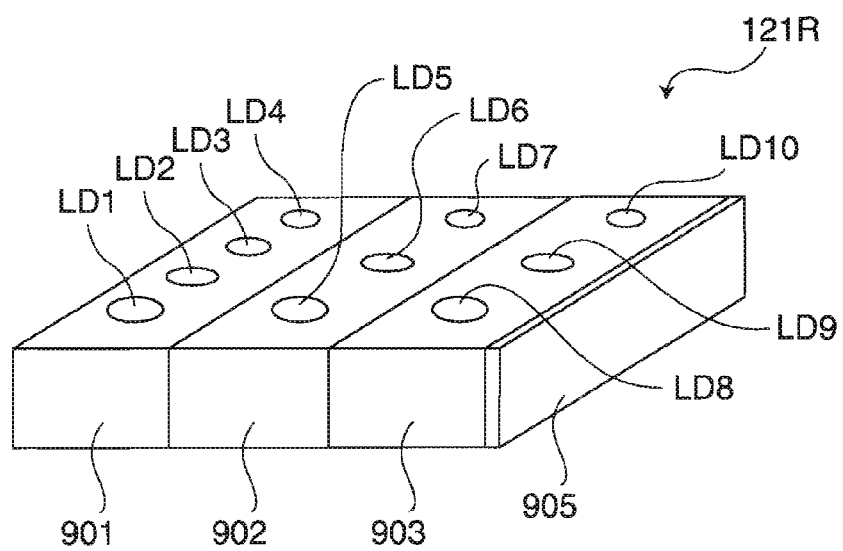
FIG. 9 is a diagram for illustrating the layout placement of the laser diode devices.

FIG. 9 shows the layout placement of the LDs 1 to 10 in the R light source section 121R. The R light source section 121R is configured by three sub laser arrays 901, 902, and 903, which are disposed in parallel. The sub laser array 901 is provided with 4 our LDs 1 to 4 each serving as a beam light emission section. The sub laser array 902 is provided with 3 LDs 5 to 7, and the sub laser array 903 is provided with 3 LDs 8 to 10, all each serving as a beam light emission section.

In the R light source section 121R, as described by referring to FIG. 5, the sub laser array 903 includes therein the LDs 8 to 10, which emit laser lights larger in light amount. The sub laser array 901 includes therein the LDs 1 to 4, which emit laser lights smaller in light amount. Out of the LDs 1 to 10 each serving as a beam light emission section, the R light source section 121R is so configured as to partially carry thereon, i.e., on the sub array 903, the LDs 8 to 10 all emitting the laser lights larger in light amount.

In the R light source section 121R, a cooling section 905 is provided to the part disposed with the sub laser array 903. The cooling section 905 serves to dissipate to the outside the heat generated in the R light source section 121R, and is exemplified by a Peltier device. With such a configuration of partially including the larger-output LDs 8 to 10, the R light source section 121R becomes able to dissipate the heat with efficiency.

Figure 10:
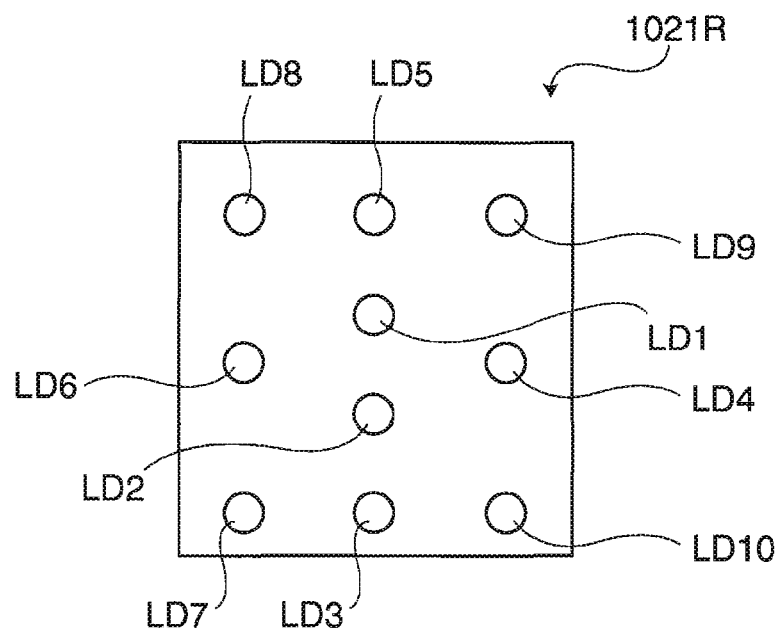
FIG. 10 is a diagram for illustrating another layout placement of the laser diode devices.
Figure 11:
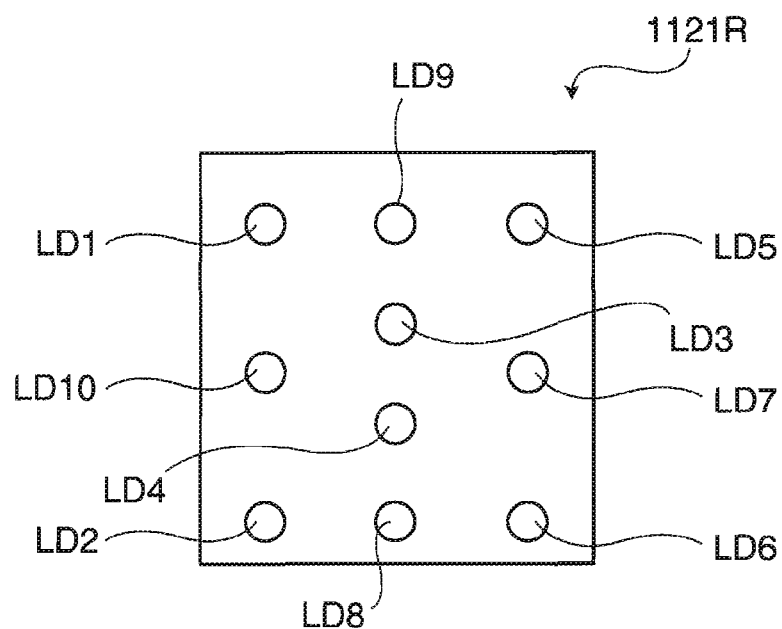
FIG. 11 is a diagram for illustrating still another layout placement of the laser diode devices.

FIGS. 10 and 11 each illustrate another layout placement of the LDs 1 to 10 in the light source section. An R light source section 1021R of FIG. 10 includes therein the larger-output LDs 8 to 10 in the vicinity of the outer rim thereof. With such a layout placement, the heat can be dissipated with efficiency to the outside of the R light source section 1021R. An R light source section 1121R of FIG. 11 includes therein the LDs 1 to 4 among the LDs 8 to 10. The LDs 1 to 4 are those emitting the laser lights smaller in light amount, and the LDs 8 to 10 are those emitting the laser lights larger in light amount. When the heat is localized in the R light source section 1121R, this may cause a problem of light amount variation among the LDs, for example. With the configuration of FIG. 11, the heat generated by the LDs 1 to 10 is prevented from being localized so that a problem of light amount variation among the LDs or others rarely occurs.

Such an array layout is not the only possible option for the light source sections to include therein the LDs 1 to 10, and a one-way parallel configuration will also do. The light source sections are not restrictive to such a configuration of including the LDs each for use as a beam light emission section. As alternatives to a plurality of LDs, a surface-emitting laser diode provided with a plurality of aperture portions will also do. With this being the case, the aperture portions emitting the laser lights each function as a beam light emission section.

Second Embodiment

FIG. 12 illustrates an image display device in a second embodiment of the invention. Exemplified here are two cases of light amount allocation for laser lights. In the second embodiment, characteristically, the light source sections are each driven in such a manner that the number of bits is plurally allocated to some of the 10 pieces of LDs 1 to 10.

In an example 2, 4 LDs 1 to 4 are each allocated two control bits. The LD 1 is allocated 0- and 7-bit control signals, and is assigned outputs of 1 mW and 128 mW. The LD 2 is allocated 1- and 2-bit control signals, and assigned outputs of 2 mW and 4 mW. The LD 3 is allocated 3- and 4-bit control signals, and outputs 8 mW and 16 mW. The LD 4 is allocated 5- and 6-bit control signals, and assigned outputs of 32 mW and 64 mW. As such, the four LDs 1 to 4 are allocated lower-order-bit control signals, i.e., in the range from 0 to 7 bits. The LDs 1 to 4 output two values not only selectively but also at the same time.

The 6 LDs 5 to 10 are each assigned an output of 128 mW. Among these LDs 5 to 10, the LDs 5 and 6 are both allocated an 8-bit control signal. The LDs 5 and 6 are in charge of an output of 256 mW in total by starting or stopping illumination of the laser lights all at once. The 4 LDs 7 to 10 are all allocated a 9-bit control signal. The LDs 7 to 10 are in charge of an output of 512 mW in total by starting or stopping illumination of the laser lights all at once. As such, the 6 LDs 5 to 10 are each allocated the higher-order-bit control signal, i.e., 8- or 9-bit control signal. With the example 2, 10 laser lights respectively allocated the higher-order-bit control signals, i.e., from 0- to 9-bit control signals, are selected in accordance with the number of tones, i.e., the number of quantized bits, for display so that a 10-bit tone representation is accordingly made.

In the example 2, the LDs 1 to 4 are each allocated 2 lower-order-bit control signals so that the number of possible combinations available for laser light selection can be increased compared with the first embodiment. What is more, the maximum output of the entire R light source section 121R can be increased up to 1023 mW so that the number of tones possibly displayed can be increased. This achieves the effects of displaying much brighter images of high quality. Note here that, although the LDs 1 to 10 in the example 1 are considered well enough if outputting 128 mW at the maximum, only the LD 1 is required to output 129 mW in the example 2. Accordingly, the second embodiment enables a 10-bit tone representation by allocating two control signals each allocated the number of bits partially to the laser lights, and by increasing the maximum output by 1 mW to a single laser light.

Figure 13:
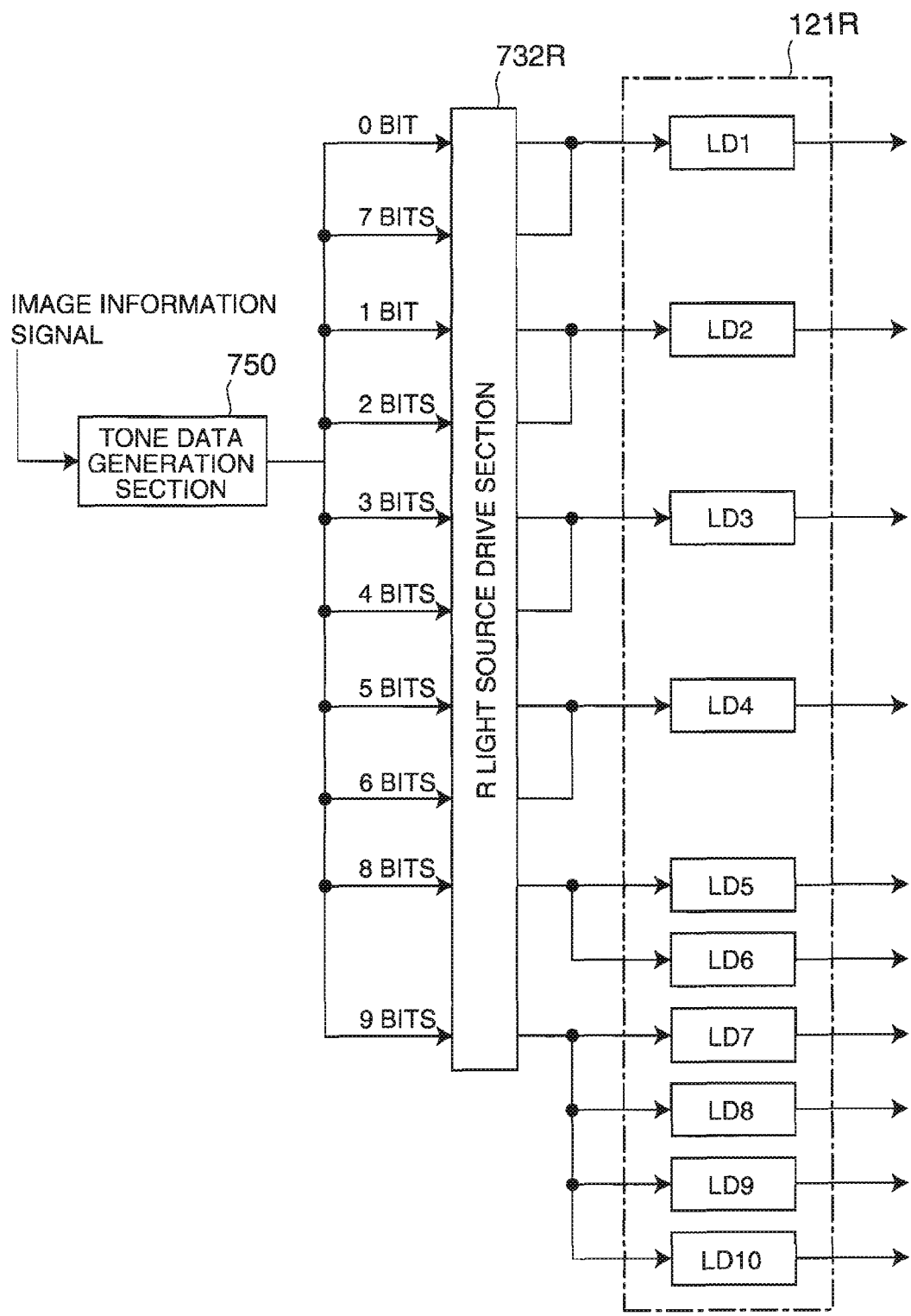
FIG. 13 is a diagram for illustrating the configuration for driving laser diode devices.

FIG. 13 illustrates in detail the configuration for driving the LDs 1 to 10 of the R light source section 121R. Based on an image information signal read from the frame memory 714 (refer to FIG. 6), the tone data generation section 750 generates 10 control signals with the number of bits in the range from 0 to 9. The R light source drive section 732R outputs the 0- and 7-bit control signals to the LD 1. To the LD 2, the 1- and 2-bit control signals are output, and to the LD 3, the 3- and 4-bit control signals are output. To the LD 4, the 5- and 6-bit control signals are output. The R light source drive section 732R outputs the 8-bit control signal to each of the LDs 5 and 6. The R light source drive section 732R also outputs the 9-bit control signal to each of the LDs 7 to 10.

Figure 14:
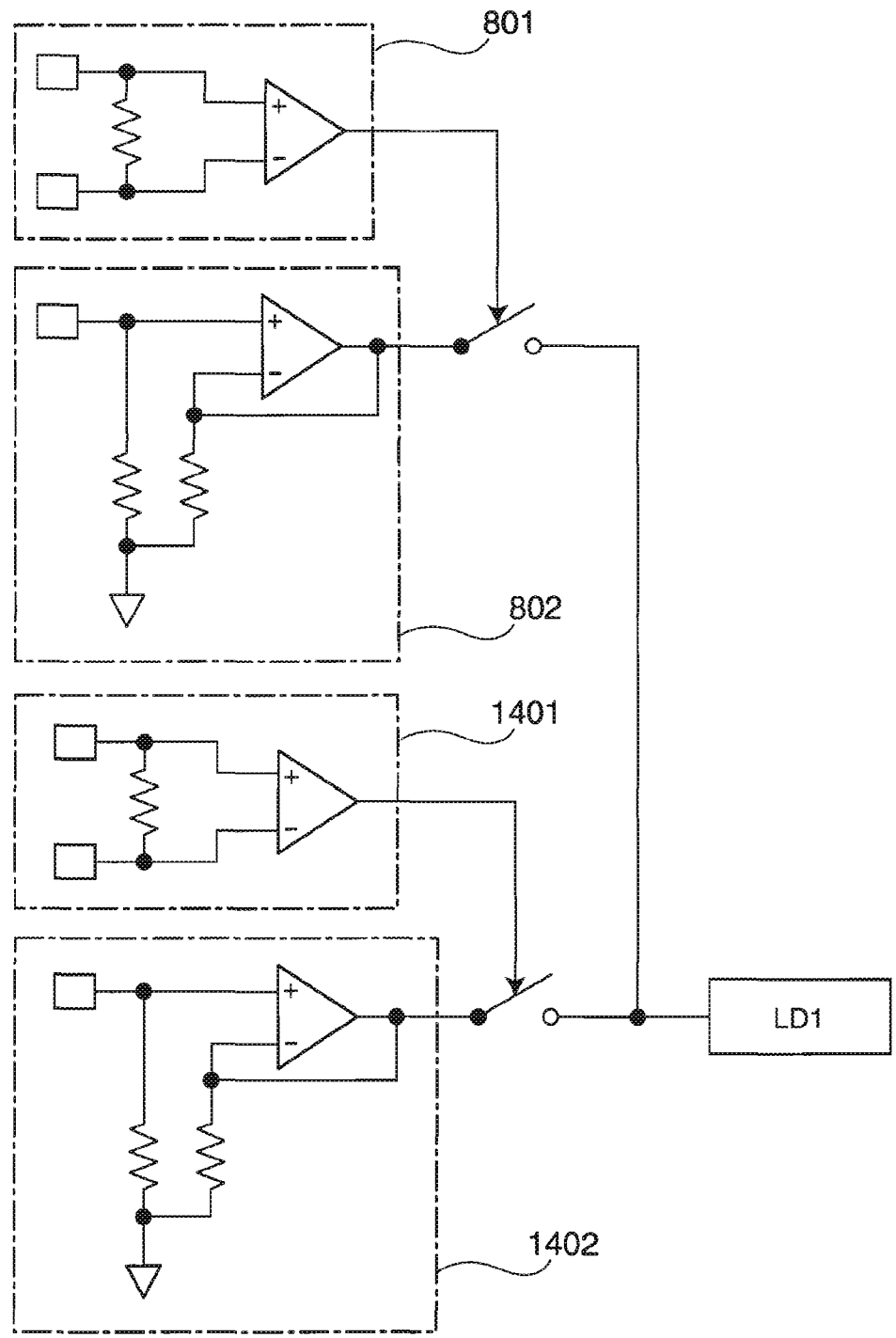
FIG. 14 is a diagram showing a single piece of laser diode device.

FIG. 14 shows the configuration for driving the LD 1 of the R light source drive section 732R. The switch section 801 exercises control over starting and stopping the laser light supply in accordance with the 0-bit control signal provided by the tone data generation section 750. The current control section 802 controls the current value to output the laser light of 1 mW. A switch section 1401 exercises control over starting and stopping the laser light supply in accordance with the 7-bit control signal provided by the tone data generation section 750. A current control section 1402 controls the current value to be an output of 128 mW allocated to the LD 1. With such a configuration, the control over starting and stopping the laser light supply can be individually applied depending on the number of bits of the control signal, i.e., 0-bit or 7-bit.

In the R light source section 121R, the LDs 2 to 4 are controlled by the configuration similar to the LD 1. The LDs 5 and 6 are so configured that their switch sections both operate in response to the 8-bit control signal. The LDs 7 to 10 are so configured that their switch sections all operate in response to the 9-bit control signal.

Figure 15:
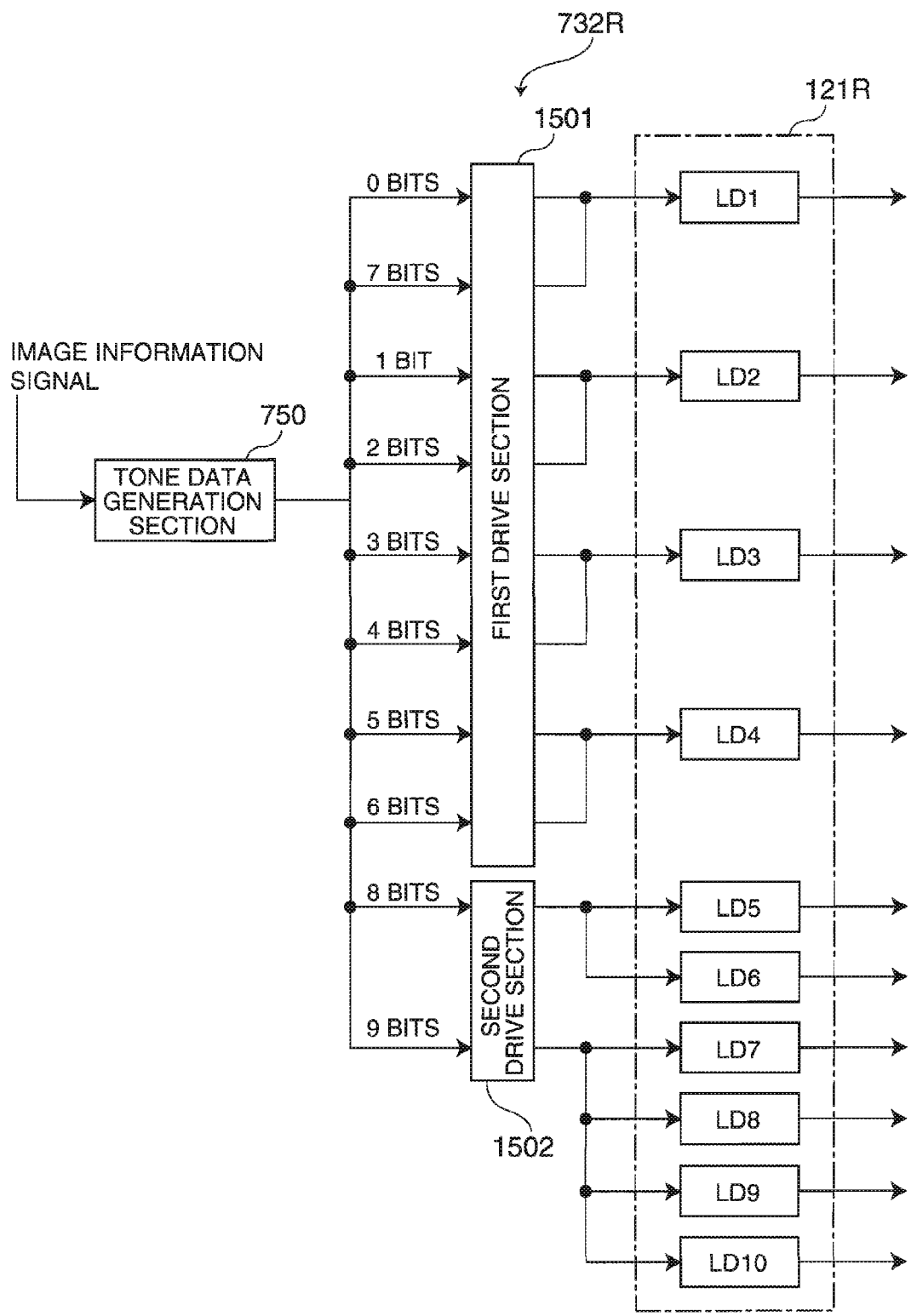
FIG. 15 is a diagram for illustrating the configuration including first and second drive sections.

As shown in FIG. 15, the R light source drive section 732R may be configured to include first and second drive sections 1501 and 1502. The first drive section 1501 drives the LDs 1 to 4, which are allocated the lower-order-bit control signals in the range from 0 being minimum to 7 being maximum. The second drive section 1502 drives the LDs 5 to 10 allocated the higher-order-bit control signals, i.e., 8-bit or 9-bit control signal.

The laser light allocated a lower-order-bit control signal requires a small output, and the laser light allocated a higher-order-bit control signal requires a large output. As in this embodiment, the LDs allocated the lower-order-bit control signal may require multilevel control, but not the LDs allocated the higher-order-bit control signal. Depending on which control signal is allocated, i.e., the lower-order-bit control signal or the higher-order-bit control signal, the LDs 1 to 10 are driven differently. As an example, the first drive section 1501 may be configured to include a low-current-driving transistor, and a circuit separately provided for current value control. The second drive section 1502 may be configured to include a high-current-driving transistor, and a current control section of a simple structure.

With the first and second drive sections 1501 and 1502 provided as such, the R light source drive section 732R can be optimized in configuration in accordance with the output. This favorably enables to cut the power consumption with no waste of components, thereby favorably saving power and cost. In the R light source drive section 732R, the LDs 1 to 4 and the LDs 5 to 10 are not necessarily driven by the first and second drive sections 1501 and 1502, respectively. The bit allocation to the LDS 1 to 10 may be used as a basis to change, as appropriate, which LDS are to be driven by the first drive section 1501, and which LDs are to be driven by the second drive section 1502.

Referring back to FIG. 12, described is a modified example of the second embodiment. In an example 3, the light source section is so driven as to allocate, out of 10 pieces of LDs 1 to 10, the LD 1 with two of the number of bits, and the LDs 2 and 3 with three of the number of bits. The LD 2 is allocated control signals of 3-, 4-, and 5-bit, and assigned outputs of 8 mW, 16 mW, and 32 mW. The LD 3 is allocated control signals of 1-, 2-, and 6-bit, and assigned outputs of 2 mW, 4 mW, and 64 mW. In the example 3, the three LDs 1 to 3 are allocated the lower-order-bit control signals, i.e., in the range from 0 to 7 bits.

Figure 16:
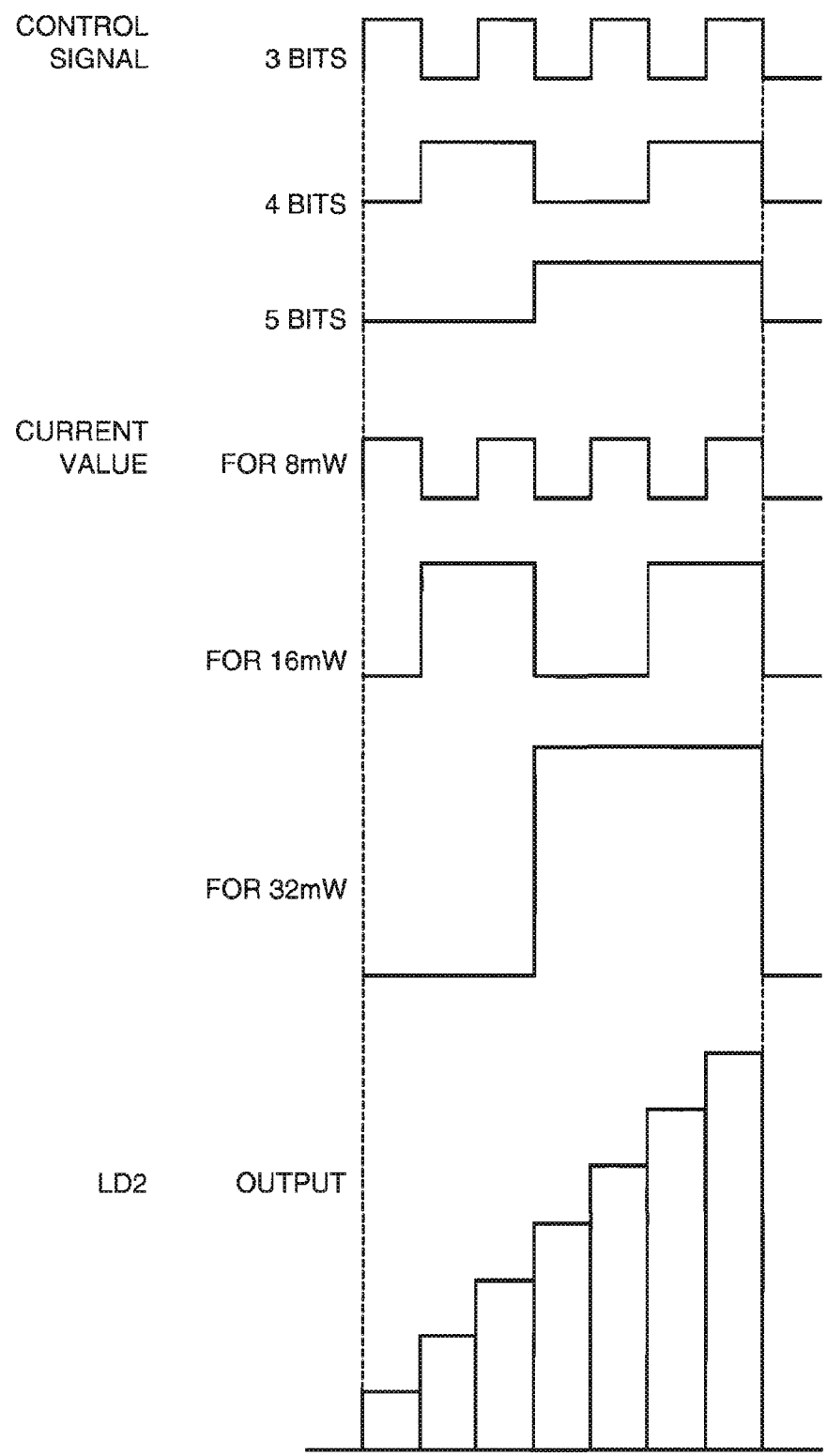
FIG. 16 is a diagram for illustrating a tone representation.

FIG. 16 illustrates a tone representation by laser lights coming from the LD 2. The LD 2 supplies a laser light of an output of 8 mW in accordance with the 3-bit control signal provided by the tone data generation section 750 (refer to FIG. 13). The LD 2 also supplies a laser light of an output of 16 mW in accordance with the 4-bit control signal. The LD 2 also supplies a laser light of an output of 32 mW in accordance with the 5-bit control signal. Selecting such laser lights as appropriate enables a tone representation in increments of 8 mW only by the laser lights coming from the LD 2. By combining the laser lights from the LD 2 and the laser lights from any other LDs, as shown in FIG. 12, it becomes able to make a tone representation with the output of 1151 mW, i.e., the maximum number of the tones.

With the example 3, by allocating the LDs 2 and 3 the control signal with the three number of bits, the number of tones can be increased compared with the case in the example 2, and a tone representation of 10 bits or more can be achieved. Note here that two or three of the number of bits are not restrictive for allocation to a single piece of laser light, and four or more of the number of bits will also do. With this being the case, the number of tones can be increased to a further degree, but the light source drive sections are to be disadvantageously complicated in configuration for laser light supply suiting the control signal no matter with how many bits.

In the example 2, if the LDs 1 to 10 are allocated in order the control signals sequentially in a range from 0 being minimum to 9 being maximum, the output of the LD 1 can be suppressed to 1 mW and 2 mW, but the output of the LD 4 will be increased to 64 mW and 128 mW. In this case, there needs to configure the LD 4 to be able to solely output 192 mW at the maximum. The LD 1 outputs only 3 mW at the maximum. As already described by referring to FIG. 9, when an array laser is formed using a plurality of LDs, normally, the maximum output will be the same among the LDs. If the LDs are so configured as to be able to output 128 mW at the maximum, this results in waste caused by hardly using the output of the LD 1.

In consideration thereof, as in the example 2, compared with a case of allocating the number of bits sequentially from minimum to maximum, an output difference is leveled among the laser lights by allocating 7 bits to the LD 1 allocated the control signal of a minimum bits. This favorably reduces the output variation observed among the laser lights; and enables to suppress the maximum output required for a single LD to 129 mW. This also enables the use of LDs all having the same maximum output, and enables to cut wastes by leveling the output difference among the LDs.

Also in the example 3, if the LDs 1 to 10 are allocated in order the control signals sequentially in a range from minimum to maximum, the LD 1 is assigned outputs of 1, 2, and 4 mW, the LD 2 is assigned outputs of 8, 16, and 32 mW, and the LD 3 is assigned outputs of 64 and 128 mW. If this is the case, the maximum output 56 mW of the LD 2 will be eight times of the maximum output 7 mW of the LD 1, and the output difference will be increased up to about 50 mW. In consideration thereof, compared with a case of allocating the number of bits sequentially from minimum to maximum, an output difference can be leveled among the laser lights by allocating the maximum outputs of the LD 1, LD 2, and LD 3 with 129 mW, 56 mW, and 70 mW. For the LDs 2 and 3, for example, the maximum output difference therebetween will be 14 mW, and the ratio of the maximum output will be almost 80%. Note here that the bit allocation to the LDs is not restrictive to the manner described in this embodiment, and compared with a case of allocating the number of bits sequentially to the LDs 1 to 10 from minimum to maximum, it will do as long as the output difference among the laser lights is leveled.

Third Embodiment

FIG. 17 illustrates an image display device in a third embodiment of the invention, and describes an exemplary case of light amount allocation for laser lights. Unlike the second embodiment in which the laser lights are partially allocated two or more of the number of bits, in the third embodiment, the laser lights are partially changed in illumination length of time depending on two or more of a pulse width. Herein, a description is given with an assumption that a light source drive pulse signal generated by the configuration of FIG. 6 has a pulse width of 1.

The LDs 1 to 10 in this embodiment supplies laser lights that are adjusted by light amount to be each different in value from a power of 2. The LD 1 to 5 are changed in illumination length of time through selection either the pulse width of 0.5 or 1. For example, through selection of a pulse width, the LD 1 is allowed to have the light amount equivalent to 1 mW, or the light amount equivalent to 2 mW. Unlike the second embodiment, in this third embodiment, the LDs 1 to 5 are allowed to output two values selectively but not at the same time. The LDs 1 to 5 take charge of display of 0 to 242 tones, which are low tones.

The LDs 6 to 10 are all fixed to the pulse width of 1, and assigned an output of 162 mW. The IDs 6 to 10 take charge of display of 243 to 1052 tones, which are nigh tones. In this embodiment, through selection based on the number of tones for display of 10 laser lights, i.e., the number of quantized bits, a 10-bit (1042 tones) tone representation becomes possible.

In the third embodiment, with such a configuration that the LDs 1 to 5 are each allowed for selecting two of a pulse width, the possible combinations for laser light selection is increased compared with the case of the first embodiment. Moreover, the maximum output of the entire R light source section 121R can be increased up to 1052 mW so that the number of tones possibly displayed can be also increased. Even if an LD having the maximum output of 128 mW is used similarly to the comparison example described by referring to FIG. 5, in this embodiment, the maximum output of the entire R light source section 121R can be increased up to 831 mW, which is three times or more of a value compared with the case with the previous technology. This achieves the effects of displaying much brighter images of higher quality.

Figure 18:
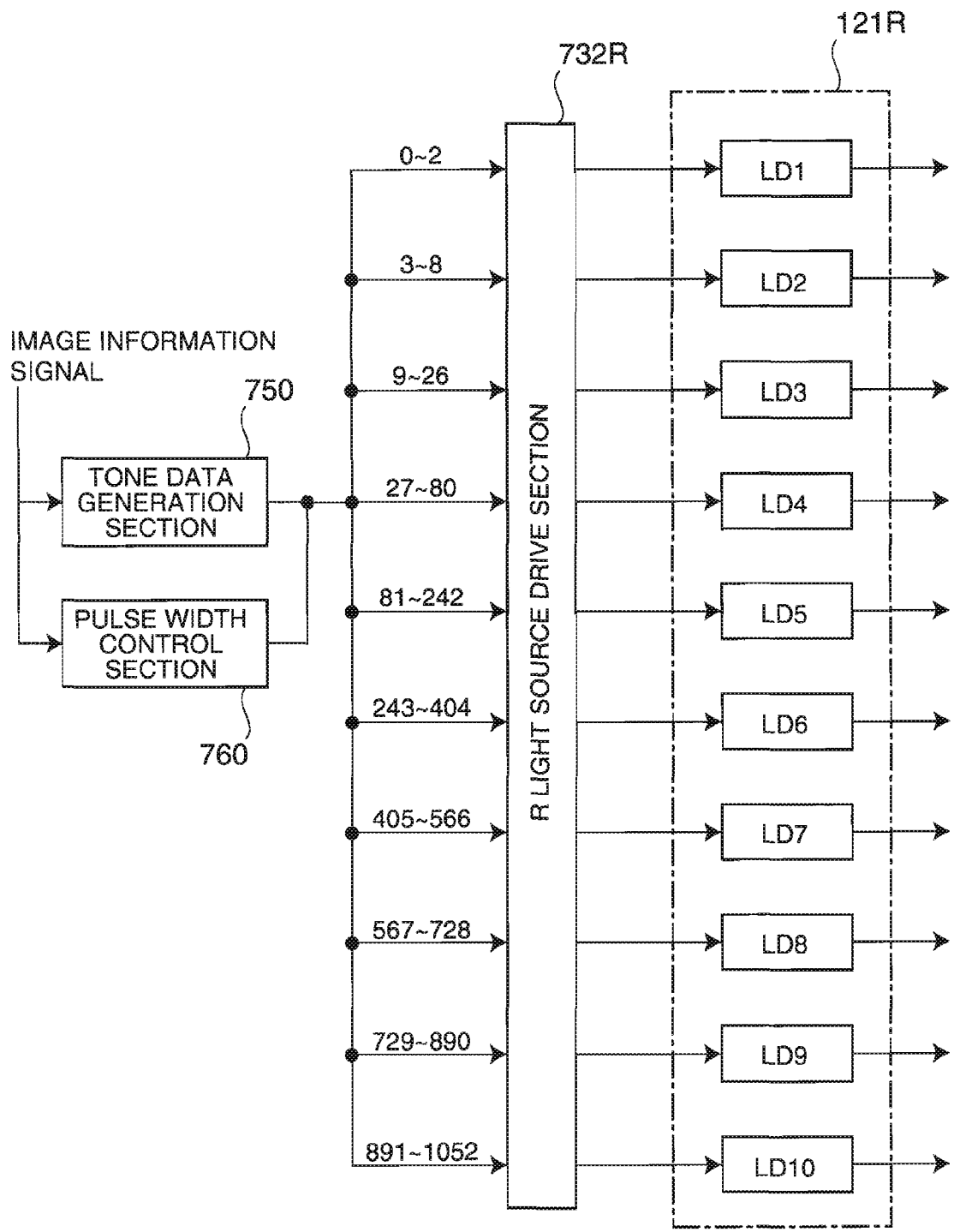
FIG. 18 is a diagram for illustrating the configuration for driving laser diode devices.

FIG. 18 illustrates in detail the configuration or driving the LDs 1 to 10 of the R light source section 121R. Based on an image information signal read from the frame memory 714 (refer to FIG. 6), the tone data generation section 750 generates 10 control signals in accordance with the number of tones to be allocated to the laser lights. The pulse width control section 760 changes the pulse width based on the image information signal.

Figure 19:
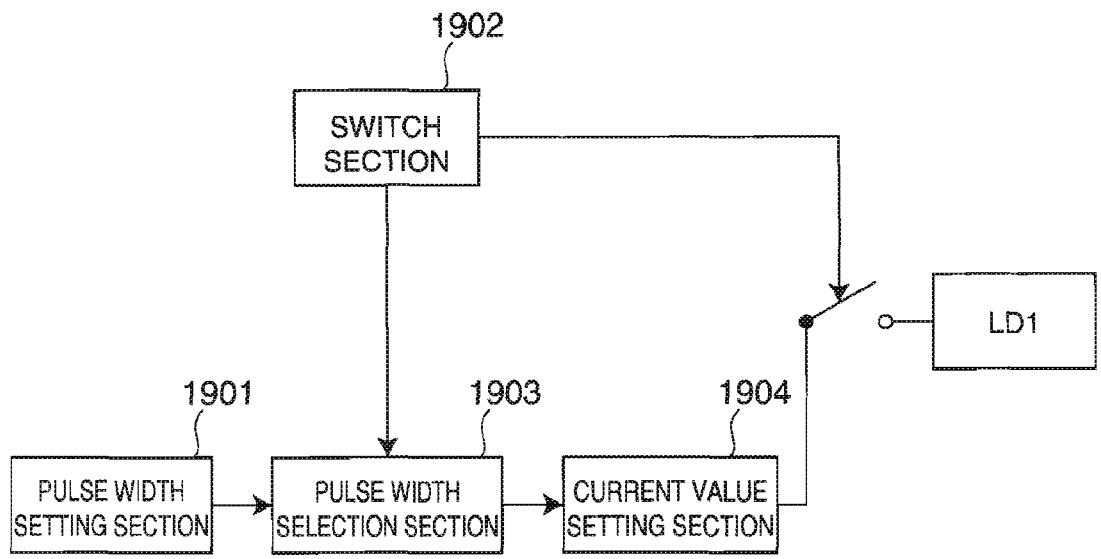
FIG. 19 is a diagram showing the configuration for driving a single piece of laser diode device.

FIG. 19 shows the configuration for driving the LD 1 of the R light source drive section 732R. A pulse width setting section 1901 stores pulse widths available for selection. In this embodiment, the pulse width setting section 1901 is storing two values of 0.5 and 1 for the pulse width. Based on the control signal of 0 to 2 tones provided by the tone data generation section 750, a switch section 1902 exercises control over starting and stopping the laser light supply. In response to the pulse change made by the pulse width control section 760, a pulse width selection section 1903 selects either of the two values stored in the pulse width setting section 1901. A current value setting section 1904 sets the current value so as to derive the output of 2 mW assigned to the LD 1. With such a configuration, the supply of the laser lights having the pulse width of 0.5 or 1 can be started or stopped for supply. The LDs 2 to 5 are controlled by the configuration similar to that of the LD 1. The LDs 6 to 10 are not required to have the configuration for such pulse width selection.

In this embodiment, similarly to the second embodiment, the R light source drive section 732R may be configured to include first and second drive sections. Note here that the allocation of the number of tones for the LDs is not restrictive to the manner described in this embodiment. By setting the pulse width available for selection or the LD outputs as appropriate, the allocation of the number of tones to the LDs can be individually changed whenever required.

Fourth Embodiment

Figure 20:
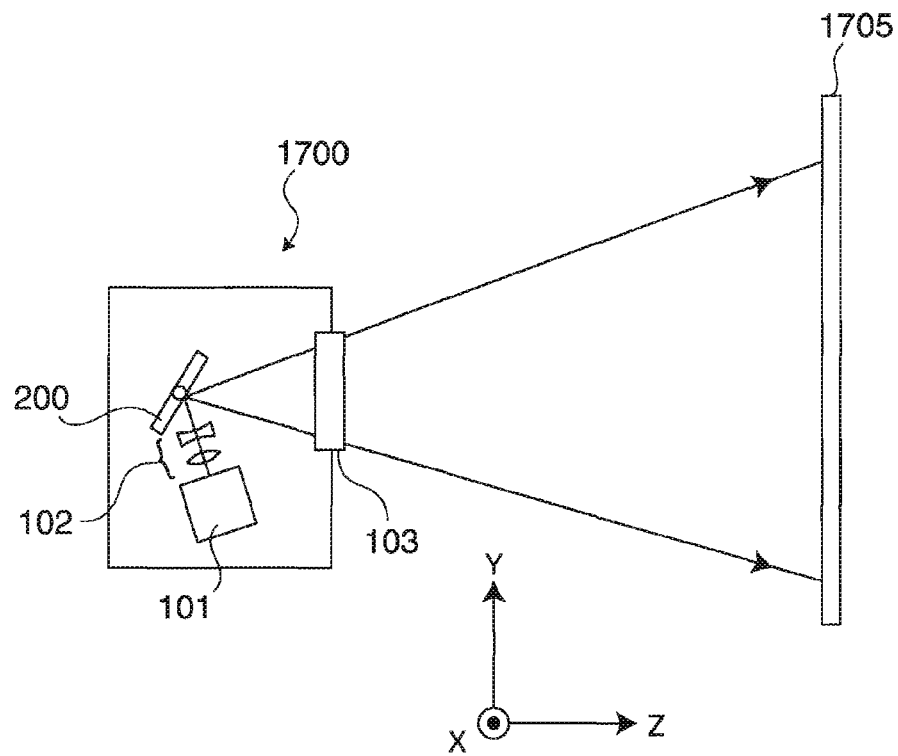
FIG. 20 is a schematic diagram showing the configuration of an image display device in a fourth embodiment of the invention.

FIG. 20 shows the schematic configuration of an image display device 1700 of a fourth embodiment of the invention. The image display device 1700 is a so-called front projector that makes images available for viewing by supplying a laser light to a screen 1705 provided on the viewer side, and by a viewer looking at the light reflected by the screen 1705. Any components similar to those in the first embodiment are provided with the same reference numerals, and not described again if already described. The laser light coming from the scanning section 200 first passes through the projection system 103, and then enters into the screen 1705. This embodiment also can display bright images with the simple configuration high in reliability.

Note here that the light source sections in the above embodiments are exemplified by using laser diode devices. This is surely not restrictive if the configuration can supply beam lights. The light source sections may be configured to use a solid-state light-emitting device including solid laser, light-emitting diode device (LED), or others, or a liquid laser or a gas laser.

As described in the foregoing, the image display device of the invention is suited for image display using a plurality of beam lights.

The entire disclosure of Japanese Patent Application No. 2005-242242, filed Aug. 24, 2005 is expressly incorporated by reference herein.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the sprit and scope of the invention.

What is claimed is:

1. An image display apparatus that displays an image through scanning by a plurality of beam lights, comprising:
    a light source section that supplies the beam lights; and
    a scanning section that subjects to scanning the beam lights coming from the light source section, wherein:
    the light source section is driven for a tone representation using the beam lights each having a light amount that is assigned a weight depending on how many bits are allocated in a range from minimum to maximum, and allocates at least two of the beam lights to at least one higher-order bit in the range; and
    the at least two of the beam lights are allocated a same number of bits.

2. The image display apparatus according to claim 1, wherein
    the light source section supplies the beam lights each having the light amount that is each adjusted to be substantially proportionate to a power of 2.

3. The image display apparatus according to claim 1, wherein
    the light source section is driven to allocate two or more of the number of bits to a part of the beam lights.

4. The image display apparatus according to claim 3, wherein
    compared with a case of allocating the number of bits sequentially from minimum to maximum, the light source section allocates the number of bits by leveling an output difference among the beam lights.

5. The image display apparatus according to claim 1, wherein
    the light source section is driven to change an illumination length of time for a part of the beam lights in accordance with two or more of a pulse width.

6. The image display apparatus according to claim 1, further comprising
    a light source drive section that drives the light source section, wherein
    the light source drive section is provided with a first drive section that supplies the beam lights allocated a lower-order bit in the range from minimum to maximum, and a second drive section that supplies the beam lights allocated a higher-order bit in the range from minimum to maximum.

7. The image display apparatus according to claim 1, wherein
    the light source section includes a plurality of beam light emission sections for emission of the beam lights located in a plurality of parts of the light source section, and
    any of the beam light emission sections is disposed in at least one of the plurality of parts of the light source section when the beam light coming therefrom is large in light amount.

8. The image display apparatus according to claim 1, wherein
    the light source section includes a plurality of beam light emission sections for emission of the beam lights, and
    any of the beam light emission sections is disposed, when the beam light coming therefrom is small in light amount, between any of the beam light emission sections that emit the beam lights large in light amount.

9. A control method for an image display apparatus that displays an image through scanning by a beam light, comprising:
    supplying plurally the beam light; and
    scanning a to-be-exposed area by the beam lights in a first direction, and in a second direction substantially orthogonal to the first direction, wherein:
    in the supplying, a tone representation is made using the beam lights each having a light amount that is assigned a weight depending on how many bits are allocated in a range from minimum to maximum, and at least two of the beam lights are allocated to at least one higher-order bit in the range; and
    the at least two of the beam lights are allocated a same number of bits.

\* \* \* \* \*